(12) United States Patent
Robitaille (10) Patent No.: US 11,488,154 B2
(45) Date of Patent: Nov. 1, 2022

(54) ELECTRONIC PAYMENT METHOD AND SYSTEM

(71) Applicant: Cyril Robitaille, La Prairie (CA)

(72) Inventor: Cyril Robitaille, La Prairie (CA)

(*) Notice: Subject to any disclaimer, the term of this patent is extended or adjusted under 35 U.S.C. 154(b) by 447 days.

(21) Appl. No.: 16/047,879

(22) Filed: Jul. 27, 2018

(65) Prior Publication Data

US 2019/0244197 A1     Aug. 8, 2019

Related U.S. Application Data

(60) Provisional application No. 62/625,445, filed on Feb. 2, 2018.

(51) Int. Cl.
| | | |
|---|---|---|
| *G06Q 20/38* | (2012.01) | |
| *G06Q 20/34* | (2012.01) | |
| *G06Q 20/40* | (2012.01) | |
| *G06Q 20/32* | (2012.01) | |
| *G06Q 20/36* | (2012.01) | |

(52) U.S. Cl.
CPC ....... *G06Q 20/3829* (2013.01); *G06Q 20/322* (2013.01); *G06Q 20/3278* (2013.01); *G06Q 20/34* (2013.01); *G06Q 20/3433* (2013.01); *G06Q 20/3674* (2013.01);
(Continued)

(58) Field of Classification Search
CPC .... G06Q 30/0263; G06Q 10/06; G06Q 50/30; G06Q 10/087; G06Q 30/0255; G06Q 20/204; G06Q 20/385; G06Q 20/18; G06Q 20/4014; G06Q 20/3829; G06Q 20/322; G06Q 20/3278; G06Q 20/34; G06Q 20/3433; G06Q 20/36714; G06Q 20/409; G06Q 20/4093
See application file for complete search history.

(56) References Cited

U.S. PATENT DOCUMENTS 4,216,529 A * 8/1980 Krystek ................. B67D 7/228
705/413
4,798,942 A * 1/1989 Aubrey ................ G06K 13/063
235/384

(Continued)

OTHER PUBLICATIONS

PCI Security Standards Council LLC, Payment Card Industry (PCI) Data Security Standard—Requirements and Security Assessment Procedures, version 3.2, Apr. 2016.
(Continued)

*Primary Examiner* — Johann Y Choo
(74) *Attorney, Agent, or Firm* — BCF LLP (57) ABSTRACT

The present disclosure relates to an electronic payment method and to an electronic payment system. A central server generates a secret number based on a payment card number. The central server associates the secret number with a transaction. A copy of the association between the secret number and the transaction is stored at a remote terminal. An access is detected at the remote terminal by acquiring the payment card number at the remote terminal. The remote terminal generates an identifier based on the payment card number. The remote terminal verifies whether the identifier matches the secret number. When the identifier matches the secret number, the remote terminal determines whether a provision of a product or service offered at the remote terminal is authorized based on a content of the transaction.

23 Claims, 7 Drawing Sheets

(52) U.S. Cl.
CPC ......... *G06Q 20/385* (2013.01); *G06Q 20/409* (2013.01); *G06Q 20/4093* (2013.01)

(56) References Cited

U.S. PATENT DOCUMENTS

| | | | | |
|---|---|---|---|---|
| 6,332,193 B1* | 12/2001 | Glass | .................... | G07F 7/1008 |
| | | | | 713/170 |
| 6,431,454 B1* | 8/2002 | Hjelmvik | .............. | G07F 7/0866 |
| | | | | 235/492 |
| 6,529,883 B1* | 3/2003 | Yee | ...................... | G06Q 20/127 |
| | | | | 705/63 |
| 7,566,003 B2 | 7/2009 | Silbernagl et al. | | |
| 7,568,617 B2 | 8/2009 | Silbernagl et al. | | |
| 8,281,990 B2 | 10/2012 | Silbernagl | | |
| 8,498,902 B1* | 7/2013 | Kogen | .................... | G06Q 40/02 |
| | | | | 705/17 |
| 8,505,816 B2 | 8/2013 | Silbernagl | | |
| 8,662,390 B2 | 3/2014 | Silbernagl | | |
| 8,763,902 B2 | 7/2014 | Silbernagl | | |
| 9,218,600 B2 | 12/2015 | Silbernagl | | |
| 9,558,487 B2 | 1/2017 | Silbernagl | | |
| 2006/0167811 A1* | 7/2006 | Bhambri | ............ | G06Q 30/0641 |
| | | | | 705/59 |
| 2007/0187491 A1* | 8/2007 | Godwin | ................. | G06Q 20/12 |
| | | | | 235/380 |
| 2008/0243702 A1* | 10/2008 | Hart | ................... | G06Q 20/3672 |
| | | | | 705/66 |
| 2010/0169182 A1* | 7/2010 | Madani | .................. | G06Q 20/12 |
| | | | | 705/21 |
| 2011/0246372 A1* | 10/2011 | Zloth | ..................... | G07F 7/082 |
| | | | | 705/75 |
| 2013/0198339 A1* | 8/2013 | Lee | ......................... | H04L 67/06 |
| | | | | 709/219 |
| 2014/0281503 A1* | 9/2014 | Mills | ................... | H04L 63/0823 |
| | | | | 713/157 |
| 2015/0040198 A1* | 2/2015 | Gopalakrishnan | ......................... | |
| | | | | H04L 63/0492 |
| | | | | 726/5 |
| 2015/0115028 A1* | 4/2015 | Montealegre | .......... | G07B 15/06 |
| | | | | 235/382 |
| 2017/0091754 A1 | 3/2017 | Silbernagl | | |
| 2017/0330167 A1* | 11/2017 | Yoon | ..................... | G06Q 20/32 |
| 2018/0089707 A1* | 3/2018 | Sills | ..................... | G06Q 10/067 |
| 2018/0174138 A1* | 6/2018 | Subbarayan | ....... | G06Q 20/3674 |
| 2018/0285868 A1* | 10/2018 | O'Hara | ................ | G06Q 20/401 |

OTHER PUBLICATIONS

Montreal Transport Society, Request for Public Interest No. STM-6022-12-17-56, "Solution Billettique De Paiement Ouvert Par Carte Bancaire", Montreal, Canada, Dec. 20, 2017.

Montreal Transport Society, Request for Public Proposition No. STM-5735-03-17-56, "Solutions Billettiques Innovantes", Montreal, Canada, Jun. 9, 2017.

* cited by examiner

Figure 7

ELECTRONIC PAYMENT METHOD AND SYSTEM

TECHNICAL FIELD

The present disclosure relates to the field of electronic payment methods and systems. More specifically, the present disclosure relates to an electronic payment method and to an electronic payment system.

BACKGROUND

Credit cards and debit cards, generally referred to herein as "payment cards", are commonly used for payments in the context of short transactions. A short transaction in this context relates to a single event such as, for example, a purchase of goods or services for which a one-time payment is obtained from a credit card or from a debit card at the time of purchase, with no further interaction between the purchaser and the seller. Further interaction will ordinarily take place solely between the issuer of the credit or debit card, i.e. a bank, and the payment card holder, i.e. the individual using the payment card to purchase the goods or services.

Long transactions relate to the purchase of goods or services for which a one-time payment leads to a number of future transactions. A non-limiting example of a long transaction is the purchase of monthly passes from transportation authorities. The user may buy a time-limited pass allowing her to access bus or subway services for a predetermined time period, typically a one-month period, without having to pay each time the transportation service is used. She may alternatively buy a pass allowing a given number of accesses to bus or subway services, for example by paying a fee for 12 passages.

In the past, such long transactions were completed by the emission of monthly paper passes that the user would show to a bus driver or to booth personnel at a subway entrance, or by the emission of a number of attached paper tickets, one ticket being redeemed for each bus or subway passage. Currently, transit authorities issue "smart cards" that hold an electronic chip, for example a radio frequency identification (RFID) chip that contains an identification of the user, along with a content of the long transaction, either an indication that a monthly fee has been paid or a number of paid passages. For example, in the Montreal region, transit authorities such as the "Société de Transport de Montréal" and other related societies emit smart cards named OPUS™ that transit users carry and use to access transportation services.

While smart cards used for long transactions are frequently used by transit authorities, they may also be used in other applications, for example in libraries, where users may buy periodic subscriptions or pay in advance for a predetermined number of book rentals.

Transit authorities excel in the operation and maintenance of transportation vehicles and systems, such as busses, subways, trains, tramways, and the like. To provide long transactions such as monthly passes, they are currently burdened with the handling and management of application-specific payment cards, i.e. smart cards, which are only used for transportation services. This is not their main domain of expertise and management of these cards form a very significant share of their operational costs.

Credit card or debit card payment for purchase of goods and services requires real-time authentication of a number of the payment card along with an accounting verification that funds are available for the requested services. These transactions typically take place over a few seconds (e.g. 5 seconds), a delay that is acceptable in many transactions, for example when paying for a restaurant bill. Such delays would be unacceptable when tens of users are accessing a bus or a subway train at once. More recent methods of payment by use of intelligent phone terminals, for example using Apple Pay™ or Google Wallet™, would suffer from the same disadvantages.

Therefore, there is a need for improved electronic payment methods and systems.

SUMMARY

According to the present disclosure, there is provided an electronic payment method. A central server generates a secret number based on a payment card number. The central server associates the secret number with a transaction. A copy of the association between the secret number and the transaction is stored at a remote terminal. An access is detected at the remote terminal by acquiring the payment card number at the remote terminal. The remote terminal generates an identifier based on the payment card number. The remote terminal verifies whether the identifier matches the secret number. When the identifier matches the secret number, the remote terminal determines whether a provision of a product or service offered at the remote terminal is authorized based on a content of the transaction.

According to the present disclosure, there is also provided an electronic payment system, comprising a first communication link, a central server and at least one remote terminal. The central server is adapted to generate a secret number based on a payment card number and to associate the secret number with a transaction. The at least one remote terminal is operatively connectable to the central server via the first communication link. The at least one remote terminal is adapted to receive, from the central server while connected thereto via the first communication link, a copy of the association between the secret number and the transaction, store the copy of the association between the secret number and the transaction, detect an access by acquiring the payment card number, generate an identifier based on the payment card number, verify whether the identifier matches the secret number, and, provided that the identifier matches the secret number, determine whether the provision of the product or service is authorized based on a content of the transaction.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems related to the burden of emitting application-specific payment cards. The present disclosure describes implementations of an electronic payment method and system in the particular, non-limiting context of a remote terminal mounted in a bus and connectable at least from time to time to a central server.

Information about a long transaction, for example a monthly bus pass or a pass for 12 successive bus rides, is generated in the central server. This information comprises a secret number and a content of the transaction. The secret number is generated on the basis of a payment card number. The content may indicate, for example, that the holder of a card bearing the payment card number has purchased a bus pass for a given month, the bus pass being valid for all busses operated by a given transit authority. Conventionally, the content of the transaction would be stored in an application-specific card emitted by the transit authority. Per the present technology, there is no need to store the content of the transaction on the payment card. Instead, a copy of an association between the secret number and the transaction (or its content) is stored in the remote terminal mounted in the bus. When the card holder accesses the bus, she places her payment card in proximity to the remote terminal. The payment card number is emitted by a radio frequency identification (RFID) chip of the payment card number and detected by the remote terminal. The remote terminal generates an identifier using the same or equivalent process as used by the central server to generate the secret number. Provided that the identifier matches the secret number, the payment card is now validated. Access to the bus is granted to the card holder, as long as the current situation (date, location) matches the content of the transaction.

The central server associates a large number of secret numbers generated based on a same number of payment card numbers to a large number of transactions. Copies of these associations are stored in a plurality of remote terminals located in a plurality of busses, subway stations, and the like.

There would be no a priori technological difficulty in storing the payment card number in the central server or in the remote terminals. However, for security reasons, the Payment Card Industry (PCI) Data Security Standard, version 3.2, April 2016, of the PCI Security Standards Council, LLC, mandates protection of stored payment card numbers, called "Primary Account Numbers" (PAN) in the PCI standard. PCI requires stored payment card numbers to be rendered unreadable when stored, including on portable media.

The present disclosure may also be used in other contexts. In one example, access to a museum may be granted to a payment card holder having purchased a monthly or a yearly subscription, in which case granting of the access may be based on the same or equivalent technology. In another example, a payment card may be used to purchase goods from a vending machine that does not have a continuous, live connection to a central server capable of obtaining real-time authorization from a payment card issuer, as long as data related to a long transaction is stored in the vending machine, in association with a secret number generated from a number of the payment card.

Figure 1:
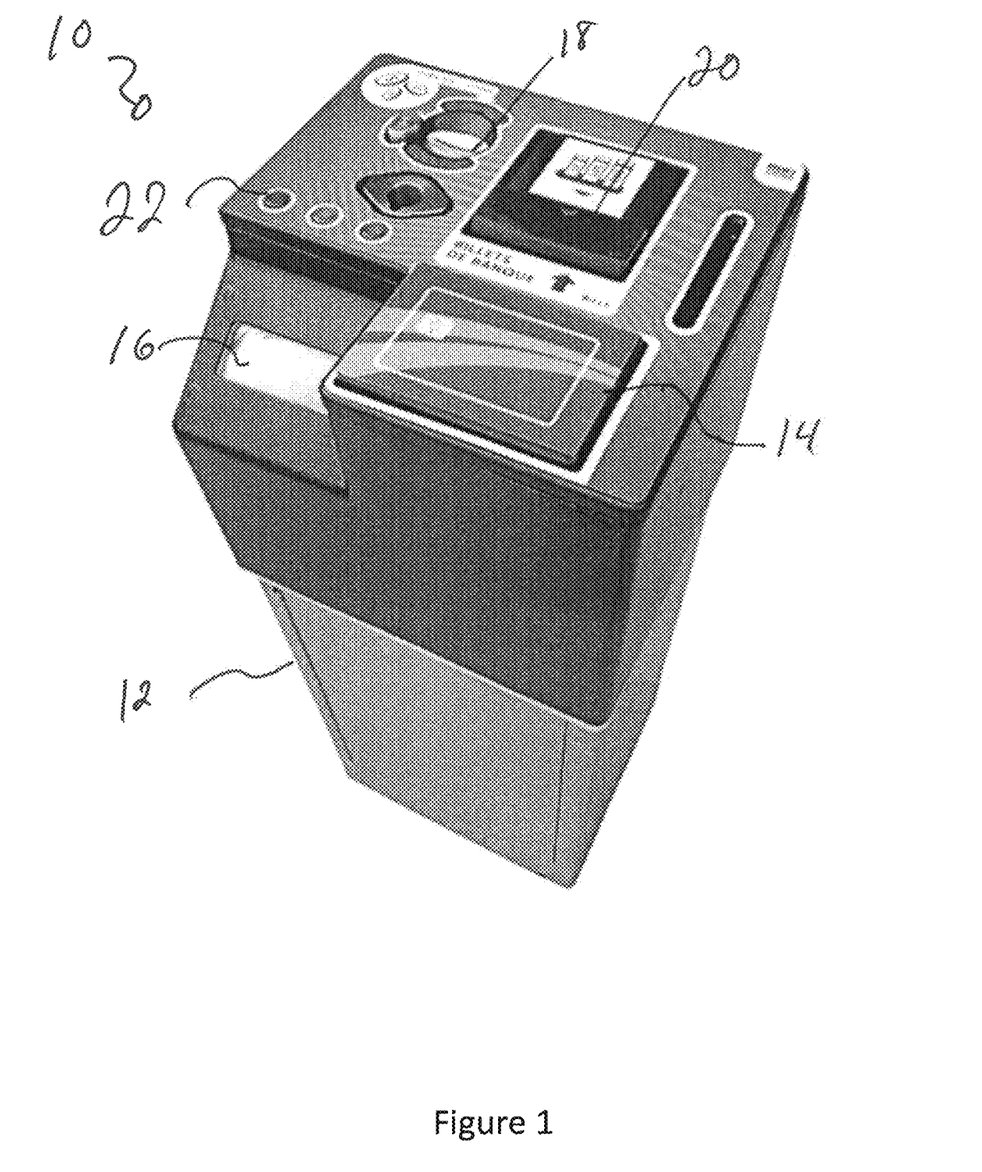
FIG. 1 is a perspective view of an interactive payment terminal installed in a bus or like vehicle.

Referring now to the drawings, FIG. 1 is a perspective view of an interactive payment terminal installed in a bus or like vehicle. A remote terminal 10 is mounted on top of a pedestal 12 for ease of access by users mounting on a bus. A panel 14 is mounted over an RFID receiver (not shown). The panel 14 illustrates a shape and logo of a transit card emitted by a local transit authority, which is an OPUS™ logo in the particular case of terminal 10. This illustration is used to incite users to approach their own transit card near the RFID receiver for authorization. An electronic display 16 is visible from a position of a bus driver and is provides a visual indication that access to the bus is accepted, or not, by the remote terminal 10. The shown remote terminal 10 also includes a slot 18 for receiving coins and a slot 20 for receiving bills, both of which are used for cash payment of a bus ride. Buttons 22 are used by the bus driver to control various functions of the remote terminal 10.

Internal components (not shown) of the remote terminal 10 include, for example, a power supply, a processor, and a box for receiving bills and coins.

Terminals similar to the remote terminal 10 are commonly used in subway stations and are operatively connected to turnstiles or to electrically controlled doors. Validation of a user access by such a terminal leads to unlocking of a connected turnstile or door, allowing user entry into the station. Some variants of the terminal 10 may include more or less components and features than those illustrated in FIG. 1. For instance, some terminals may not be equipped to receive a cash payment.

Figure 2:
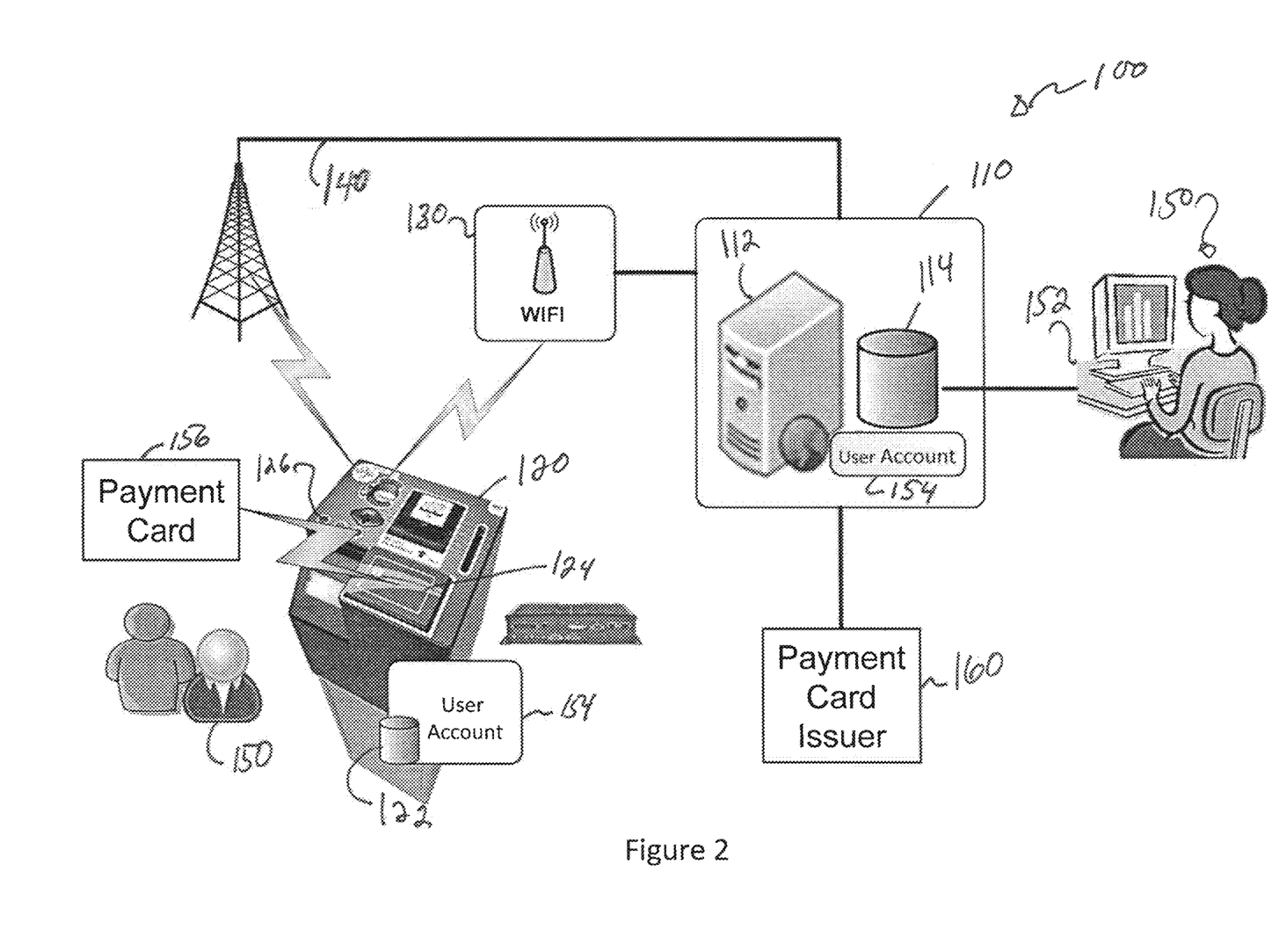
FIG. 2 is a block diagram of an electronic payment system according to an embodiment.

FIG. 2 is a block diagram of an electronic payment system according to an embodiment. An electronic payment system 100 comprises a central server 110 and at least one remote terminal 120 (more generally a plurality of remote terminals 120). A first communication link 130 is established, at least from time to time, between the central server 110 and the remote terminals 120, for example when the remote terminal 120 is mobile and currently in close proximity to the central server 110. A second communication link 140 may be established between the central server 110 and the remote terminals 120, for example over a cellular network, for example when the remote terminal 120 is mobile and not in close proximity with the central server 110. The central server 110 is managed by a transit authority that operates a fleet of vehicles, such as busses, on which remote terminals 120 are installed and are therefore mobile. The transit authority may also operate a train system or a subway system, remote terminals 120 being installed at each train or subway gateway. The central server 110 includes a computer 112 that implements a portal for access by users 150 of the system, a user account database 114 and a connection to a payment card issuer 160 (more generally a plurality of payment card issuers), either directly or through a payment broker, for example Moneris Solutions™.

A user 150 uses her computer 152 to access the portal of central server 110. She enters a payment card number, which is a number of either a credit card or a debit card, along with required security information. She may purchase a monthly pass for the whole or for a part of services provided by the transit authority. She may alternatively purchase a number of instances of use of the services provided by the transit authority, for example purchasing 12 individual bus or subway passages. Regardless, this action of the user 150 forms a long transaction having, as a content, the monthly pass or the individual bus or subways passages that she is purchasing. The central server 110 obtains a payment for the transaction from a payment card issuer 160 having issued the debit card or credit card bearing the payment card number provided by the user 150. In many instances, the payment is obtained from the payment card issuer by using a payment card industry (PCI) protocol.

Figure 3:
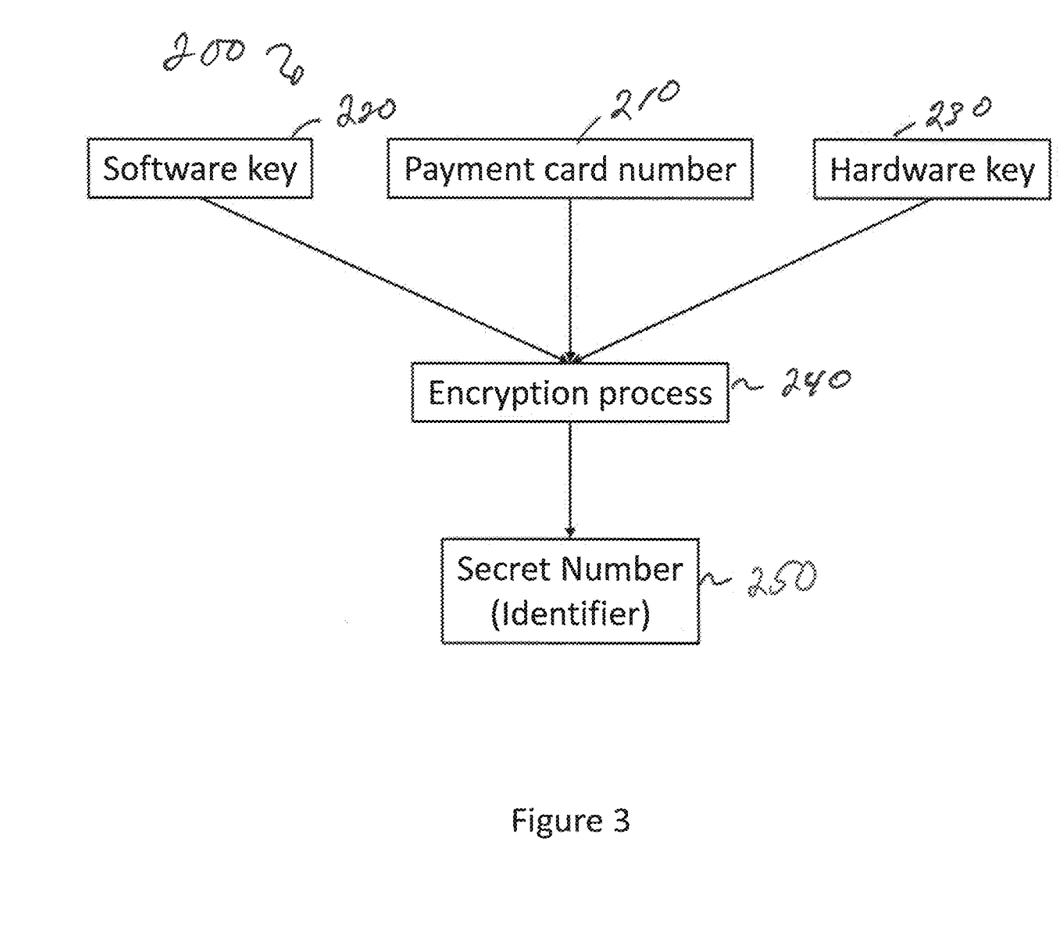
FIG. 3 is a non-limiting example of an encryption method used for generating a secret number based on a payment card number.

Having received the payment, the central server 150 generates a secret number based on the payment card number. FIG. 3 is a non-limiting example of an encryption method used for generating a secret number based on a payment card number. In an embodiment, the payment card number 210, a software key 220 and a hardware key 230 are fed into an encryption process 240 that generates a secret number 250. Other methods of generating the secret number are also contemplated. These methods should be compliant with the requirements of the Payment Card Industry (PCI) Data Security Standard. Compliance to the standard is met when the payment card number is not recoverable from the secret number.

Returning now to FIG. 2, the central server 150 associates the secret number 250 with the transaction initiated by the user 150 and stores this association at a user account 154 for the user 150 in the user account database 114. It will be understood that the central server 150 stores such associations as a plurality of user accounts 154 for a large number of distinct users 150.

Some remote terminals 120 are fixedly positioned, being for example located in subway stations. These remote terminals 120 may be connected to the central server 110 over the first communication link 130 by wire (e.g. Ethernet) or wirelessly (e.g. by WiFi or Bluetooth™), this connection being continuous or intermittent. Some remote terminals 120 are mobile, being for example mounted in busses. The first communication link 130 may be established between the remote terminals 120 and the central server 110 from time to time, for example when a bus is at a station for refueling, for maintenance, when unused at night, and the like. At those times, the first communication link 130 may be established between the remote terminal 120 and the central server 110 using a detachable wired connection (not shown) or using a short-range wireless connection, for example by WiFi or Bluetooth™.

While a given remote terminal 120 is connected to the central server 110 via the first communication link, copies of each association between secret numbers and corresponding transactions, i.e. copies of each user account 154, are transferred from the central server 110 and stored in the given remote terminal 120. In time, each remote terminal 120 of the transit authority will receive copies of each association between secret numbers and corresponding transactions. The remote terminal 120 stores the copies of the user accounts 154 in a local user account database 122.

It is recognized that the user 150 may purchase a monthly pass on the first few days of that month, or may purchase a number of bus rides, just before leaving and to catch a bus. In order to ensure timely updating of her user account information in those terminals 120 that are mounted into busses, transmitting information about her user account 154 from the central server 110 to those terminals 120 using the second communication link 140 established over the cellular network is also contemplated.

The user 150 mounts on a bus (or accesses a gate at a subway station). She holds her payment card 156 equipped with an RFID chip that emits the payment card number 210 near an RFID reader 124 of the remote terminal 120 mounted in the bus. The remote terminal 120 detects this access by acquiring the payment card number 210 by use of its RFID reader 124. In the remote terminal 120, a processor (not shown) generates an identifier based on the payment card number 210. The processor of the remote terminal 120 generates the identifier using the same or equivalent process as used in the central server 110 to generate the secret number 250, for example the keys 220, 230 and encryption process 240 as described in FIG. 3. The remote terminal 120 verifies whether or not the identifier matches one of a plurality of secret numbers 250 stored at the remote terminal 120.

The remote terminal 120 may deny access to the bus when the identifier does not match any secret number 250 stored at the remote terminal 120.

Provided that the identifier matches a stored secret number 250, the remote terminal 120 determines whether the access to the bus is authorized based on a content of the transaction stored in the user account 154. This will be the case, for example, when the user 150 has purchased a monthly pass for the current month, the monthly pass covering a territory where she is getting on the bus. Access to the bus may also be authorized, for example, when the user 150 has purchased a number of individual bus or subway passages and when her user account 154 shows that she currently has at least one (1) passage left. The remote terminal 120 authorizes the provision of the product or service, decrements in the user account 154 for that user 150 the number of individual bus or subway passages, and forwards to the central server 110, via the second communication link 140, the decremented number of individual bus or subway passages for that user 150, identified on the second communication link 140 by use of the secret number 250. The central server 110 locates the proper user account 154 for that user 150 and updates the user account 154 based on the secret number based on the received decremented number of individual bus or subway passages.

In both above cases, access authorization is generally granted by the remote terminal to the user 150 is less than 500 milliseconds. Updating of the user account 154 in the central server 110 may take a few seconds, particularly when updating is made via a cellular network. This delay has not discernable impact on the perception of the service by the user 500.

Access to the bus may be denied when the user 150 has purchased a number of individual bus or subway passages and when her user account 154 shows that she currently no passage left.

Access denial by the remote terminal 120 may be overcome by establishment of a short transaction for payment of a single access. The remote terminal 120 comprises an operator console 126 that includes one or more buttons for receiving an operator command. Following access denial at the bus, a bus operator may enter a command requesting authorization for a single bus passage. In an implementation, given that the remote terminal 120 has already calculated an identifier based on the payment card number of the card held near the RFID receiver 124, the operator command may consist of simply depressing one button. The remote terminal 120 forwards to the central server 110 a request for authorizing the single bus passage. This request may be sent via the second communication link 140 given that, at the time, the bus may be distant from the central server 110. In cases where the remote terminal 120 is fixedly located at a subway gate, the request may be sent via any available communication link. The central server 110 obtains a payment for the single bus passage from the payment card issuer 160. The central server 110 forwards an authorization for the single bus passage to the remote terminal 120, using the same communication link. It is expected that this short transaction can be completed within a few seconds, this delay being comparable to effecting a cash payment on an ordinary terminal.

In at least one embodiment, the remote terminal 120, configured to support the features as described in relation to the description of FIGS. 2 and 3, may also integrate the features of the terminal 10 (FIG. 1), thus being further capable of handling accesses using those traditional smart cards that are currently used by transit authorities. Most transit authorities already implement and use servers that may be modified to support the features disclosed herein while, at the same time, providing continuing support for traditional smart cards.

Figure 4:
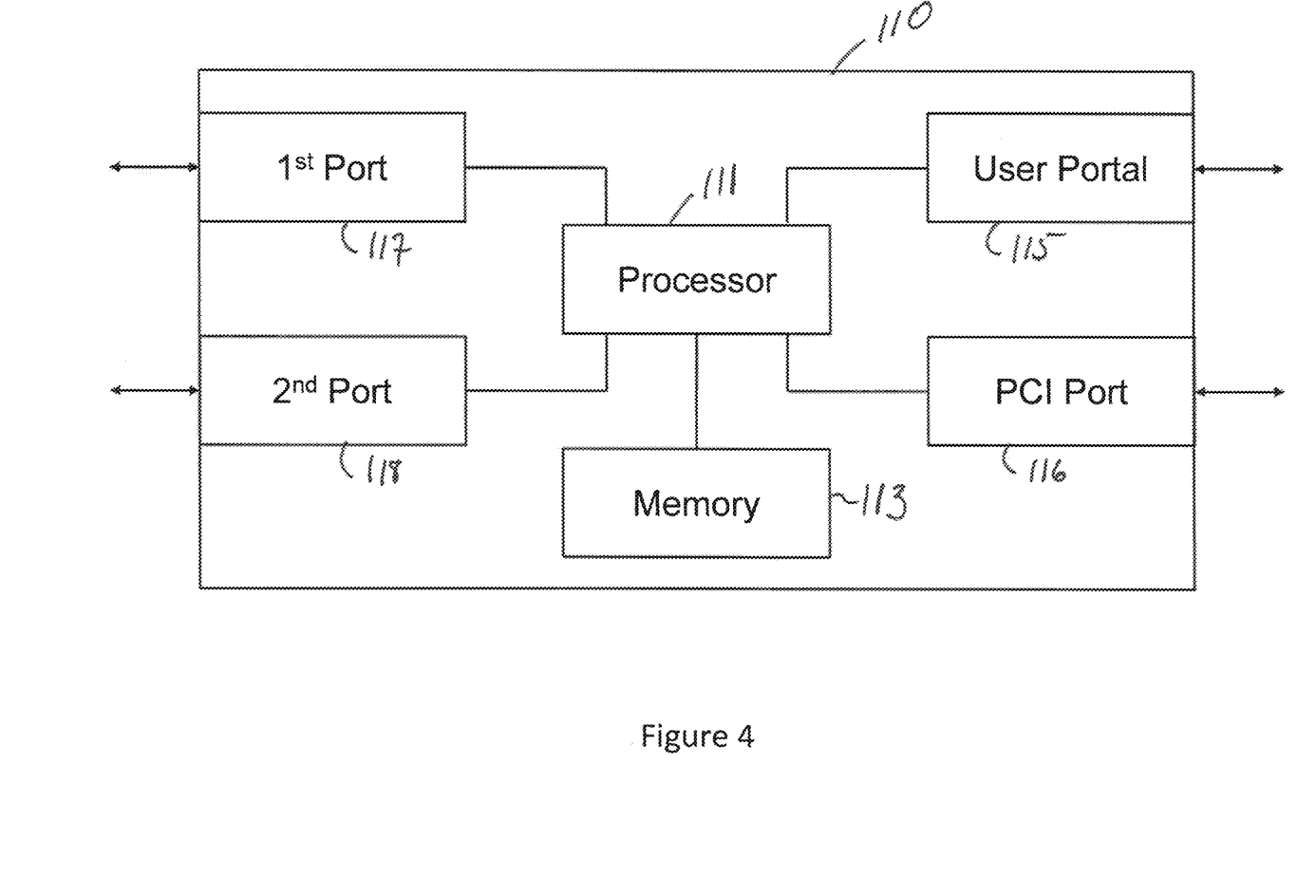
FIG. 4 is a block diagram showing internal components of a central server.

FIG. 4 is a block diagram showing internal components of a central server. In an embodiment, the central server 110 includes a processor 111 of the computer 112, a memory 113 containing the user account database 114, a user portal 115 for access by the users 150 via the Internet, a PCI port 116 for connecting the central server 110 to payment card issuers 160, a first communication port 117 for communicating with the remote terminals 120 via the first communication link 130, and a second communication port 118 for communicating with the remote terminals 120 via the second communication link 140. The processor 111 is operatively connected to each of the memory 113, the user portal 115, the PCI port 116, the first communication port 117 and the second communication port 118. The central server 110 may be implemented as a single computer, for example the computer 112, or as a plurality of interconnected devices. The user portal 115 and the PCI port 116 may implement web accesses. The first communication port 117 may implement a wired or wireless connection. The second communication port 118 may implement a cellular interface, or be directly or indirectly connected to a cellular interface.

Figure 5:
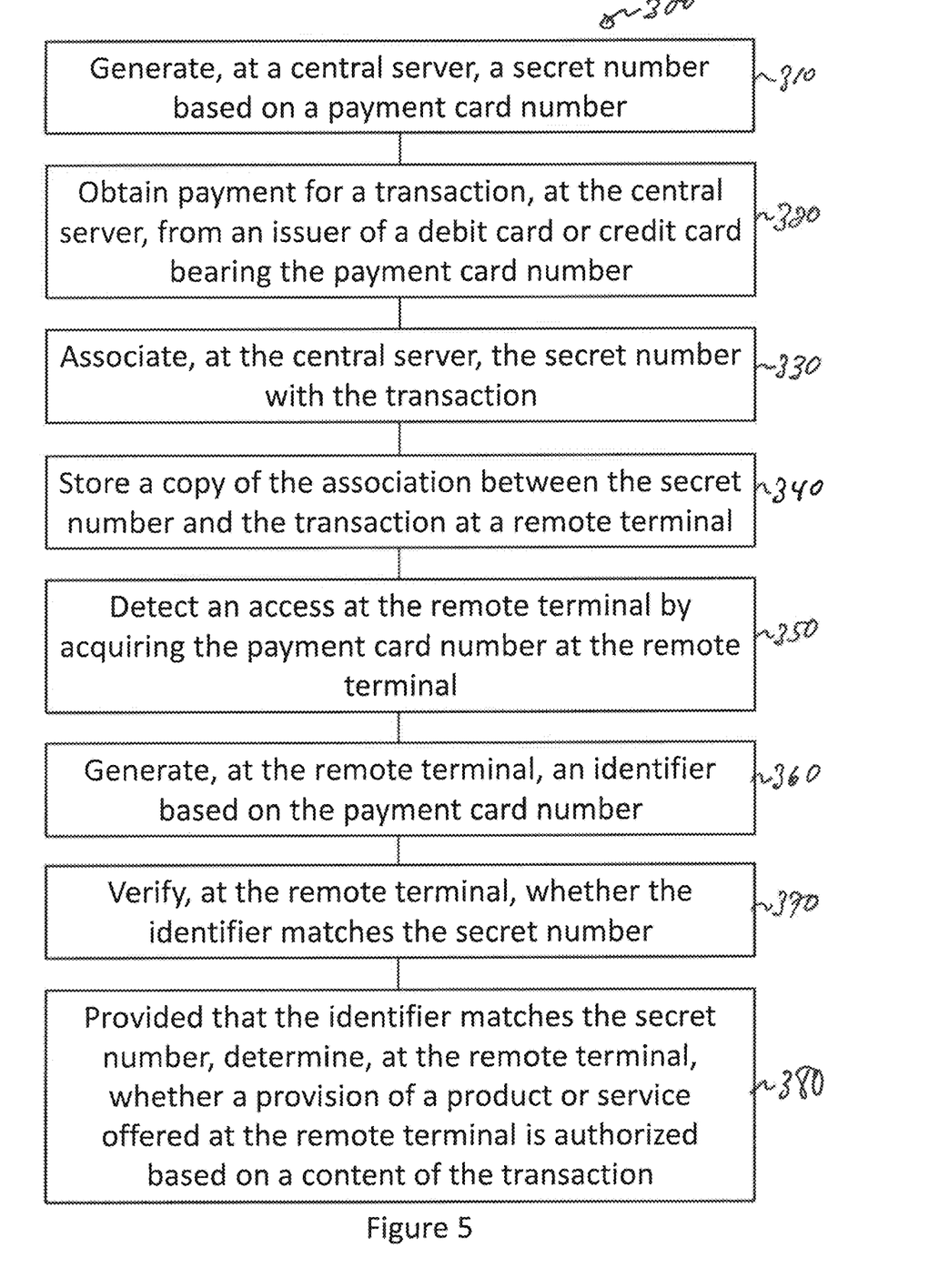
FIG. 5 is a sequence diagram showing operations of an electronic payment method according to an embodiment.

FIG. 5 is a sequence diagram showing operations of an electronic payment method according to an embodiment. On FIG. 5, a sequence 300 comprises a plurality of operations that may be executed in variable order, some of the operations possibly being executed concurrently, some of the operations being optional. In the electronic payment method of FIG. 5, operation 310 comprises generating, at the central server 110, the secret number 250 based on the payment card number 210 for the user 150. The central server 110 may generate the secret number 250 by applying an encryption algorithm on the payment card number 250, using for example the method of FIG. 3. At operation 320, payment for the transaction is obtained, at the central server 110, from the payment card issuer 160. The central server 110 associates, at operation 330, the secret number 250 with a transaction requested by the user 150. A copy of the association between the secret number 250 and the transaction at the remote terminal 120 at operation 340. The association between the secret number 250 and the transaction may be transmitted to the remote terminal 120 by one of a wired or wireless connection. Alternatively, a copy of the association may be provided to the remote terminal 120 on a disc, on a universal serial bus (USB) key, or using like hardware technology. At operation 350, the remote terminal 120 detects an access of the user 150 by acquiring the payment card number 210, for example by use of a RFID signal emitted by the payment card and received at the remote terminal 120. The remote terminal 120 generates an identifier based on the payment card number 210 at operation 360. The remote terminal 120 may generate the identifier by applying an encryption algorithm on the payment card number 250, using for example the method of FIG. 3. At operation 370, the remote terminal 120 verifies whether the identifier matches the secret number 250. Provided that the identifier matches the secret number 250, the remote terminal 120 determines, at operation 380, whether a provision of a product or service offered at the remote terminal 120 is authorized based on a content of the transaction.

While the above description of the sequence 300 mentions an association between a transaction and a secret number 250 generated from a payment card number 210, it will be understood that the central server 110 can generate a plurality of secret numbers, each secret number being based on a distinct payment card number. The central server 110 can then associate each distinct secret number with a corresponding transaction. Copies of each association between the distinct secret numbers and their corresponding transactions are stored in each of a plurality of remote terminals 120. Each remote terminal 120 may detect accesses, generate identifiers, and deny or authorize the provision of a product of service. The provision of the product or service is denied at a given remote terminal 120 when an identifier generated at the time of access does not match any secret number stored at the given remote terminal 120.

A given remote terminal 120 may deny the provision of a product or service when the content of the transaction for the payment card number 210 does not match any given product or service provided at the given remote terminal 120. In a non-limiting example, the user 150 may have purchased a monthly pass for a limited geographical coverage area of a transit authority. While her payment card number 210 may be properly identified by a positive match between the secret number 250 and an identifier generated at the given remote area 120, she may be denied access on a bus route outside of this limited geographical coverage area.

In one variant, the verification made at operation 380 for authorizing the product or service shows that the content of the transaction comprises a time-limited pass for the provision of the product or service. This will be the case, for example, when the service is a transportation service for which a monthly pass has been purchased by the user 150. In such case, operation 380 may further comprise authorizing the provision of the product or service when the access occurs within a time period covered by the time-limited pass for the service. Other verifications may be made, for example to ensure that the monthly pass corresponds to a geographical location of the remote terminal 120.

Figure 6:
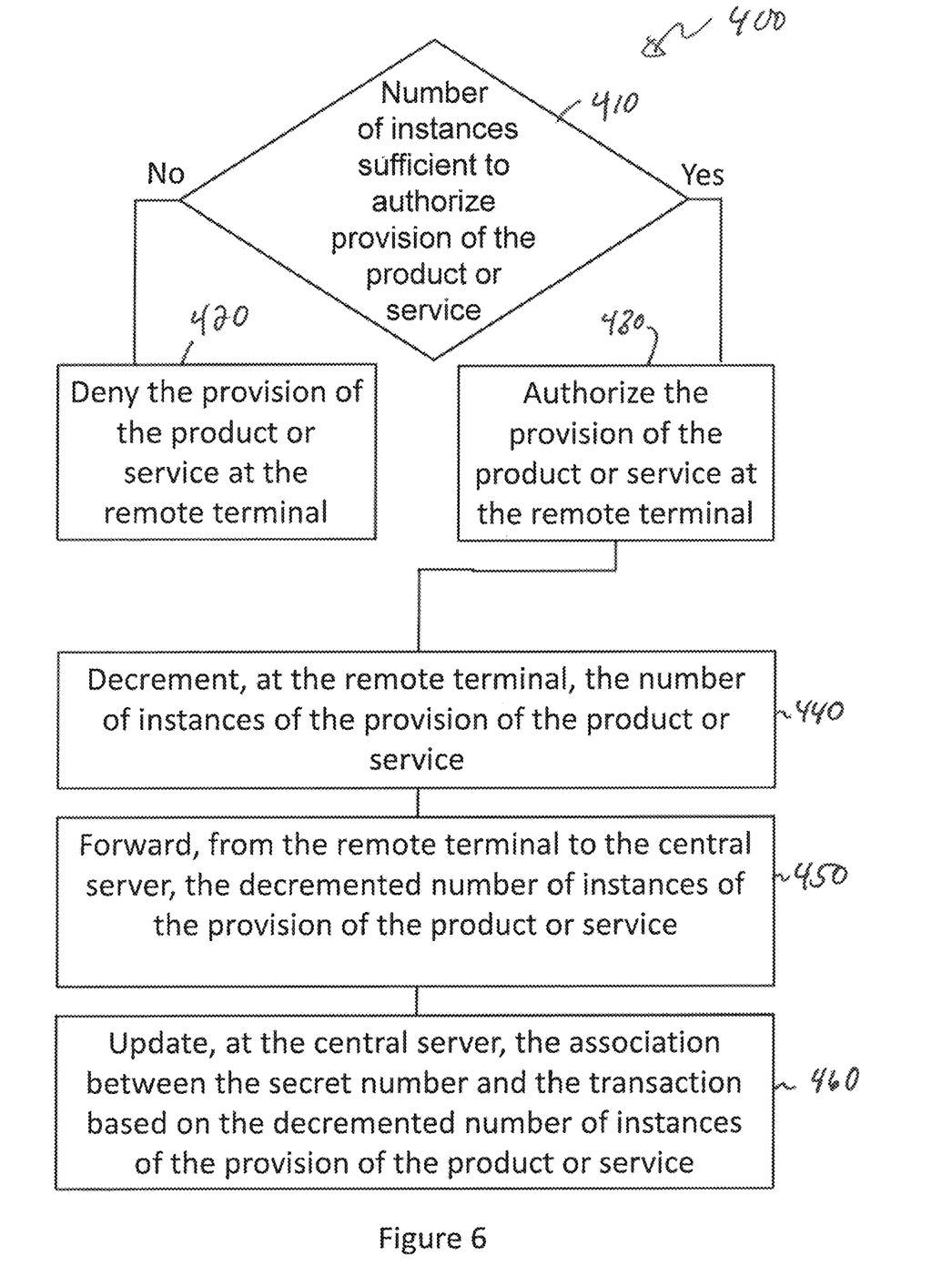
FIG. 6 is a sequence diagram showing operations of an optional method for updating a user account.

In another variant, the verification made at operation 380 for authorizing the product or service shows that the content of the transaction comprises a number of instances of the provision of the product or service. In those cases, the user 150 may or may not have remaining instances for the provision of the product or service in her user account 154. If the provision of the product or service is authorized, the number of remaining instances is updated. To this end, FIG. 6 is a sequence diagram showing operations of an optional method for updating a user account. On FIG. 6, a sequence 400 comprises a plurality of operations that may be executed in variable order, some of the operations possibly being executed concurrently, some of the operations being optional. Verification is made at operation 410 whether the number of instances in the user account 154 of the user 150 is sufficient to authorize the provision of the product or service. If the number of instances is insufficient, the provision of the product or service is denied at the remote terminal 120, at operation 420. If the number of instances is sufficient, the provision of the product or service is authorized at the remote terminal 120, at operation 430. The remote terminal 120 decrements the number of instances of the provision of the product or service at operation 440. At operation 450, the remote terminal 120 forwards the decremented number of instances of the provision of the product or service to the central server 110. The central server 110 updates the association between the secret number 250 and the transaction based on the decremented number of instances of the provision of the product or service at operation 460.

Figure 7:
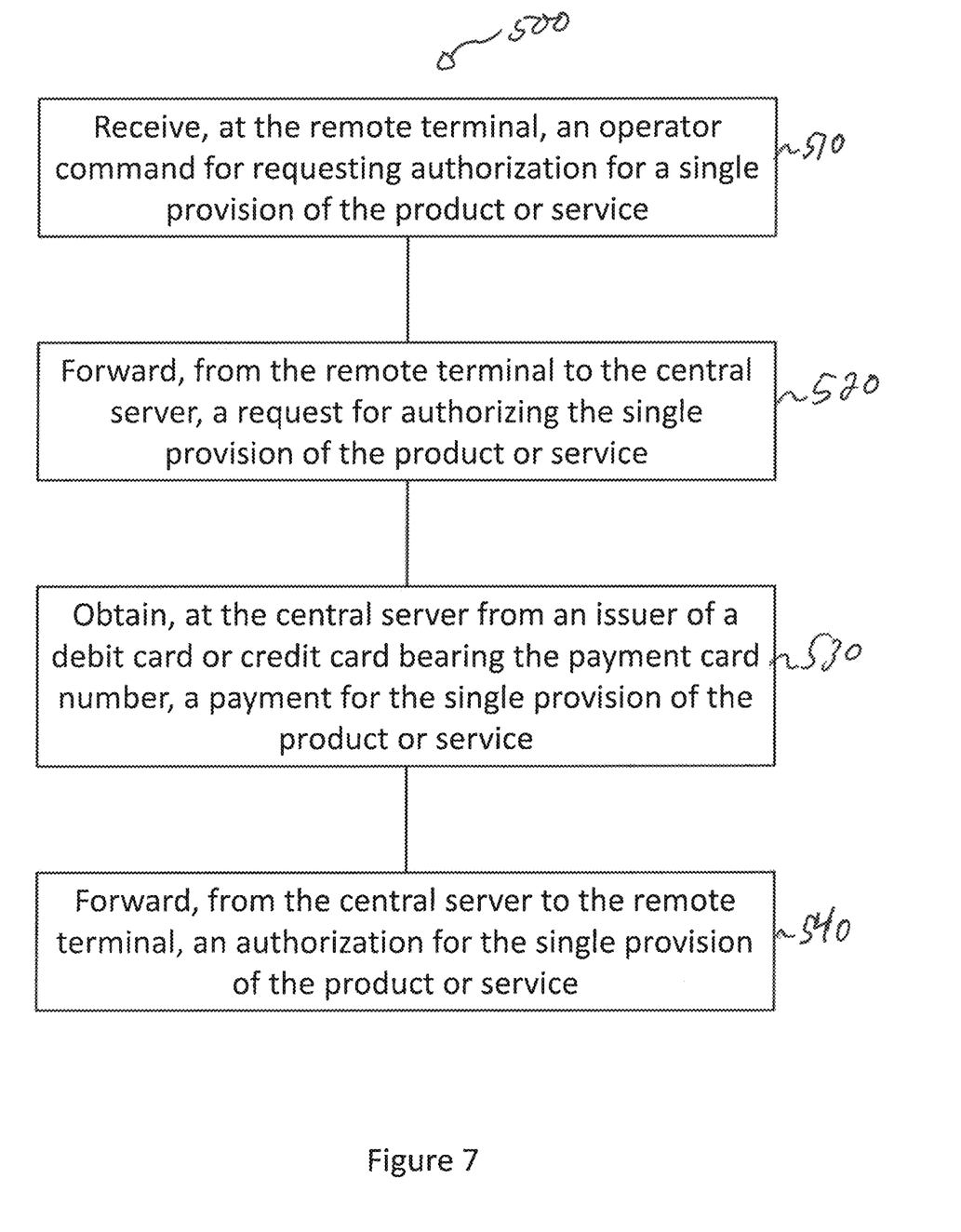
FIG. 7 is a sequence diagram showing operations of an optional method for single authorization.

Denial of the provision of a product or service at the outcome of one of sequences 300 or 400 may be overcome by the acquiring a single authorization for the user 150. FIG. 7 is a sequence diagram showing operations of an optional method for single authorization. On FIG. 7, a sequence 500 comprises a plurality of operations that may be executed in variable order, some of the operations possibly being executed concurrently, some of the operations being optional. When operation 380 determines that the identifier does not match any secret number 250 stored in the remote terminal 120, when operation 380 determines that the content of the transaction for the user 150 does not correspond to a product or service offered at the remote terminal 150, or when operation 410 determines that the number of instances is not sufficient to authorize the provision of the product or service, the remote terminal 120 may receive, at operation 510, an operator command for requesting authorization for a single provision of the product or service. In a typical scenario where access to a bus is denied, the user 150 may ask the bus operator to obtain an one-time pass. To issue the operator command, the bus operator pushes on a button on the operator console 126. The remote terminal 120 forwards a request for authorizing the single provision of the product or service to the central server 110 at operation 520. At operation 530, the central server 110 obtains a payment for the single provision of the product or service from the payment card issuer 160 having issued a debit card or credit card bearing the payment card number. The central server 110 forwards an authorization for the single provision of the product or service to the remote terminal at operation 540.

Those of ordinary skill in the art will realize that the description of the electronic payment method and system are illustrative only and are not intended to be in any way limiting. Other embodiments will readily suggest themselves to such persons with ordinary skill in the art having the benefit of the present disclosure. Furthermore, the disclosed method and system may be customized to offer valuable solutions to existing needs and problems related to long transactions. In the interest of clarity, not all of the routine features of the implementations of the method and system are shown and described. In particular, combinations of features are not limited to those presented in the foregoing description as combinations of elements listed in the appended claims form an integral part of the present disclosure. It will, of course, be appreciated that in the development of any such actual implementation of the method and system, numerous implementation-specific decisions may need to be made in order to achieve the developer's specific goals, such as compliance with application-, system-, network-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of electronic payment methods and systems having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. An electronic payment method, comprising:
generating, at a central server operated by an operator, a secret number based on a payment card number;
associating, at the central server, the secret number with a provision, to a user of a payment card bearing the payment card number, of a product or service offered by the operator at a remote terminal operated by the operator, the remote terminal being distant from the central server and located where the product or service is offered by the operator, the remote terminal being connectable to the central server over a communication link, the remote terminal being configured to detect the payment card number when emitted by the payment card;
transmitting, over the communication link, a copy of the association between the secret number and the provision of the product or service offered by the operator from the central server of the operator to the remote terminal of the operator;
storing the copy of the association between the secret number and the provision of the product or service offered by the operator at the remote terminal of the operator;
detecting an access at the remote terminal of the operator, the access being detected by receiving a given payment card number at the remote terminal directly from a given payment card having been placed in proximity to the remote terminal;

generating, at the remote terminal of the operator, an identifier based on the given payment card number;

comparing, at the remote terminal of the operator, the identifier and the secret number;

if the identifier is not equal to the secret number, denying by the remote terminal of the operator to a user of the given payment card, the provision of the product or service offered by the operator, wherein detecting, generating, comparing, and denying are performed without an additional communication between the remote terminal and the central server;

if the identifier is equal to the secret number and if the content of the transaction indicates that the provision of the product or service offered by the operator at the remote terminal of the operator is not authorized, denying by the remote terminal of the operator to the user of the given payment card, the provision of the product or service offered by the operator, wherein detecting, generating, comparing, and denying are performed without an additional communication between the remote terminal and the central server;

if the identifier is equal to the secret number and if a content of the transaction indicates that the provision of the product or service offered by the operator at the remote terminal of the operator is authorized, authorizing by the remote terminal of the operator to the user of the given payment card, the provision of the product or service offered by the operator, wherein detecting, generating, comparing, and authorizing are performed without an additional communication between the remote terminal and the central server; and selectively causing, by the remote terminal, updating an account of the user of the payment card at the central server.

2. The method of claim 1, further comprising obtaining payment for the transaction, at the central server, from an issuer of a debit card or credit card bearing the payment card number.

3. The method of claim 1, wherein the content of the transaction comprises a time-limited pass for the provision of the product or service, the method further comprising authorizing the provision of the product or service when the access occurs within a time period covered by the time-limited pass for the service.

4. The method of claim 1, wherein the content of the transaction comprises a number of instances of the provision of the product or service, the method further comprising:

if the number of instances is insufficient to authorize the provision of the product or service, denying the provision of the product or service at the remote terminal; and if the number of instances is sufficient to authorize the provision of the product or service:

authorizing the provision of the product or service at the remote terminal, decrementing, at the remote terminal, the number of instances of the provision of the product or service, after the step of authorizing, forwarding, from the remote terminal to the central server, the decremented number of instances of the provision of the product or service, and wherein selectively causing, by the remote terminal, updating an account of the user of the payment card at the central server comprises updating, at the central server, the account of the user of the payment card by updating the association between the secret number and the transaction based on the decremented number of instances of the provision of the product or service.

5. The method of claim 1, wherein:

the central server generates the secret number by applying an encryption algorithm on the payment card number; and the remote terminal generates the identifier by applying the encryption algorithm on the payment card number.

6. The method of claim 1, wherein the association between the secret number and the transaction is transmitted to the remote terminal by one of a wired or wireless connection.

7. The method of claim 1, wherein the payment card number is acquired at the remote terminal by use of a radio frequency identification (RFID) signal.

8. The method of claim 1, further comprising:

generating, at the central server, a plurality of secret numbers, each secret number being based on a distinct payment card number;

associating, at the central server, each distinct secret number with a corresponding transaction; and storing a copy of each association between the distinct secret numbers and their corresponding transactions to each of the plurality of remote terminals.

9. The method of claim 8, further comprising denying the provision of the product or service at the remote terminal if the identifier is not equal to any secret number stored at the remote terminal.

10. The method of claim 9, further comprising:

receiving, at the remote terminal, an operator command for requesting authorization for a single provision of the product or service;

forwarding, from the remote terminal to the central server, a request for authorizing the single provision of the product or service;

obtaining, at the central server from an issuer of a debit card or credit card bearing the payment card number, a payment for the single provision of the product or service; and forwarding, from the central server to the remote terminal, an authorization for the single provision of the product or service.

11. The method of claim 1, further comprising storing copies of the association between the secret number and the transaction at each of a plurality of remote terminals, each of the plurality of remote terminals being adapted for:

detecting the access by acquiring the given payment card number;

generating the identifier based on the given payment card number;

comparing the identifier with the secret number; and selectively authorizing or denying the provision of the product or service to the user of the given payment card number based on the content of the transaction and based on comparing of the identifier with the secret number.

12. The method of claim 11, further comprising denying the provision of the product or service at a given remote terminal in response to determining that the content of the transaction for the given payment card number does not match any given product or service provided at the given remote terminal.

13. The method of claim 12, further comprising:

receiving, at the given remote terminal, an operator command for requesting authorization for a single provision of the product or service;

forwarding, from the given remote terminal to the central server, a request for authorizing the single provision of the product or service;

obtaining, at the central server from an issuer of a debit card or credit card bearing the payment card number, a payment for the single provision of the product or service; and forwarding, from the central server to the given remote terminal, an authorization for the single provision of the product or service.

14. An electronic payment system, comprising:

a first communication link;

at least one remote terminal operated by an operator; and a central server operated by the operator, the central server being adapted to generate a secret number based on a payment card number and to associate the secret number with a provision, to a user of a payment card bearing the payment card number, of a product or service offered by the operator at the at least one remote terminal, the at least one remote terminal being distant from the central server and located where the product or service is offered by the operator, the at least one remote terminal being connectable to the central server over the first communication link, the at least one remote terminal being configured to detect the payment card number when emitted by the payment card; and the at least one remote terminal being adapted to:
receive, from the central server while connected thereto via the first communication link, a copy of the association between the secret number and the provision of the product or service offered by the operator, store the copy of the association between the secret number and the provision of the product or service offered by the operator, detect an access by receiving a given payment card number directly from a given payment card having been placed in proximity to the at least one remote terminal, generate an identifier based on the given payment card number, compare the identifier and the secret number, if the identifier is not equal to the secret number, deny to a user of the given payment card, the provision of the product or service offered by the operator, wherein detecting, generating, comparing, and denying are performed without an additional communication between the remote terminal and the central server;

if the identifier is equal to the secret number and if the content of the transaction indicates that the provision of the product or service offered by the operator at the remote terminal of the operator is not authorized, deny to the user of the given payment card, the provision of the product or service offered by the operator, wherein the detecting, generating, comparing, and denying are performed without an additional communication between the remote terminal and the central server, if the identifier is equal to the secret number and if a content of the transaction indicates that the provision of the product or service offered by the operator is authorized, authorize to the user of the given payment card, the provision of the product or service offered by the operator, wherein detecting, generating, comparing, and authorizing are performed without an additional communication between the remote terminal and the central server; and selectively cause updating an account of the user of the payment card at the central server.

15. The electronic payment system of claim 14, wherein:

the at least one remote terminal is mobile; and the first communication link is selected from a detachable wired connection and a short-range wireless connection;

wherein the at least one remote terminal is further adapted to communicate with the central server via the first communication link when in close proximity to the central server.

16. The electronic payment system of claim 15, further comprising:

a second communication link;

wherein the at least one remote terminal is further adapted to communicate with the central server via the second communication link when not in close proximity to the central server.

17. The electronic payment system of claim 16, wherein the second communication link is on a cellular network.

18. The electronic payment system of claim 16, wherein the content of the transaction comprises a number of instances of the provision of the product or service, wherein the at least one remote terminal is further adapted to:

deny the provision of the product or service when the number of instances is insufficient to authorize the provision of the product or service; and if the number of instances is sufficient to authorize the provision of the product or service:
authorize the provision of the product or service,
decrement the number of instances of the provision of the product or service, and
after authorizing, forward to the central server, via the second communication link, the decremented number of instances of the provision of the product or service;

wherein the central server is further adapted to update the association between the secret number and the transaction based on the decremented number of instances of the provision of the product or service.

19. The electronic payment system of claim 16, wherein the at least one remote terminal is further adapted to deny the provision of the product or service when the identifier does not match the secret number stored at the at least one remote terminal.

20. The electronic payment system of claim 19, wherein:

the at least one remote terminal further comprises an operator console adapted to receive an operator command requesting authorization for a single provision of the product or service;

the at least one remote terminal is further adapted to forward to the central server, via the second communication link, a request for authorizing the single provision of the product or service; and the central server is further adapted to obtain, from an issuer of a debit card or credit card bearing the payment card number, a payment for the single provision of the product or service and to forward to the at least one remote terminal, via the second communication link, an authorization for the single provision of the product or service.

21. The electronic payment system of claim 14, wherein the central server is adapted to obtain a payment for the transaction from an issuer of a debit card or credit card bearing the payment card number by using a payment card industry (PCI) protocol.

22. The electronic payment system of claim 14, wherein the central server further comprises a portal adapted to receive the payment card number and the content of the transaction from a user.

23. The electronic payment system of claim 14, wherein at least one remote terminal comprises a radio frequency identification (RFID) receiver adapted to receive a RFID signal carrying the payment card number.

\* \* \* \* \*